US012148903B2

(12) United States Patent
Schmitz et al.

(10) Patent No.: US 12,148,903 B2
(45) Date of Patent: Nov. 19, 2024

(54) BATTERY CASE

(71) Applicant: MUBEA CARBO TECH GMBH, Salzburg (AT)

(72) Inventors: Sebastian Schmitz, Salzburg (AT); Bernhard Spielvogel, Moosbach (AT); Andrea Adriani, Saaldorf-Surheim (DE); Hubertus Josef Steffens, Drolshagen (DE)

(73) Assignee: MUBEA CARBO TECH GMBH, Salzburg (AT)

( * ) Notice: Subject to any disclaimer, the term of this patent is extended or adjusted under 35 U.S.C. 154(b) by 110 days.

(21) Appl. No.: 17/055,830

(22) PCT Filed: May 10, 2019

(86) PCT No.: PCT/EP2019/062081
§ 371 (c)(1),
(2) Date: Nov. 16, 2020

(87) PCT Pub. No.: WO2019/224020
PCT Pub. Date: Nov. 28, 2019

(65) Prior Publication Data
US 2021/0210808 A1 Jul. 8, 2021

(30) Foreign Application Priority Data

May 24, 2018 (CH) .................................. 00659/18

(51) Int. Cl.
*H01M 10/613* (2014.01)
*B60L 50/64* (2019.01)
(Continued)

(52) U.S. Cl.
CPC ........... *H01M 10/613* (2015.04); *B60L 50/64* (2019.02); *H01M 10/625* (2015.04);
(Continued)

(58) Field of Classification Search
CPC ............ H01M 10/613; H01M 10/615; H01M 10/625; H01M 10/6554; H01M 10/6568;
(Continued)

(56) References Cited

U.S. PATENT DOCUMENTS 6,225,778 B1 * 5/2001 Hayama .............. H01M 50/566
320/112
2004/0033416 A1 * 2/2004 Kim ...................... H01M 50/55
429/185
(Continued)

FOREIGN PATENT DOCUMENTS

CN 102092267 A 6/2011
CN 102714287 A 10/2012
(Continued)

OTHER PUBLICATIONS

PCT International Search Report dated Jul. 10, 2019 in connection with PCT International Patent Application No. PCT/EP/2019/062081, 4 pages.
(Continued)

*Primary Examiner* — Lingwen R Zeng
(74) *Attorney, Agent, or Firm* — Amster, Rothstein & Ebenstein, LLP

(57) ABSTRACT

The invention is directed to a battery case (1) comprising a compartment (2) for at least one battery module (3). Two first outer beams (4) extending in a first spatial direction (x) and two second outer beams (5) extending in a second spatial direction (y) are arranged essentially perpendicular to the first spatial direction. The first and second beams (4, 5) are forming a frame-like support structure (6). A tub-shaped insert (7) is connected to the grid like support structure (6) from a third direction (z) arranged essentially perpendicular to the first and the second direction (x, y). A closure (8)
(Continued)

closes the tub-shaped insert (7) to form the closed compartment (2) for the at least one battery module.

17 Claims, 3 Drawing Sheets

(51) Int. Cl.
*H01M 10/625* (2014.01)
*H01M 10/6554* (2014.01)
*H01M 10/6568* (2014.01)
*H01M 50/209* (2021.01)
*H01M 50/249* (2021.01)

(52) U.S. Cl.
CPC ... *H01M 10/6554* (2015.04); *H01M 10/6568* (2015.04); *H01M 50/209* (2021.01); *H01M 50/249* (2021.01)

(58) Field of Classification Search
CPC .. H01M 50/20; H01M 50/209; H01M 50/249; Y02E 60/10
See application file for complete search history.

(56) References Cited

U.S. PATENT DOCUMENTS

| | | | |
|---|---|---|---|
| 2008/0160394 A1* | 7/2008 | Takasaki | B60K 1/04 429/96 |
| 2011/0020676 A1* | 1/2011 | Kurosawa | H01M 10/653 429/62 |
| 2011/0143179 A1* | 6/2011 | Nakamori | H01M 50/20 429/99 |
| 2012/0301765 A1 | 11/2012 | Loo et al. | |
| 2012/0312614 A1* | 12/2012 | Fujiwara | H01M 50/20 180/68.5 |
| 2013/0280565 A1* | 10/2013 | Lee | H01M 50/211 429/151 |
| 2021/0138886 A1* | 5/2021 | Spielvogel | F28F 3/12 |

FOREIGN PATENT DOCUMENTS

| | | |
|---|---|---|
| CN | 102820439 A | 12/2012 |
| CN | 104733795 A | 6/2015 |
| CN | 206992191 U | 2/2018 |
| EP | 2 623 353 A1 | 8/2013 |

OTHER PUBLICATIONS

PCT Written Opinion of the International Searching Authority dated Jul. 10, 2019 in connection with PCT International Patent Application No. PCT/EP/2019/062081, 7 pages.
English Translation of National Intellectual Property Administration, PRC, First Office Action in Application No. 2019800331753, Jun. 6, 2022, 12 pp., China.
English Translation of National Intellectual Property Administration, PRC, Search Report in Application No. 2019800331753, May 26, 2022, 3 pp., China.
Xingeun Tong (US); translated by Bing An, Weiwen Lu, and YiPing Wu, Beijing: National Defense Industry Press, Advanced Materials for Thermal Management of Electronic Packages [M], Apr. 30, 2016, p. 381, Beijing, China.
Edited by Japan Automobile Technology Association, translated by China Automotive Engineering Association, Beijing: Beijing Institute of Technology Press, Automotive Engineering Handbook 10 New Energy Vehicle Design [M], Jul. 31, 2014, pp. 249-250, Beijing, China.
Authored and edited by Yuanmin Zhang, Beijing: China Communications Press, General knowledge of automobile non-metallic parts 2nd edition [M], Mar. 31, 1956, pp. 32-33, Beijing, China.
Edited by Yanyan Dong and Wanjun Wang, Beijing: Beijing Institute of Technology Press, Power Battery and Management System Design for Pure Electric Vehicle [M], Apr. 30, 2017, pp. 122-123, Beijing, China.
National Intellectual Property Administration, People's Republic of China, Search Report, May 13, 2023, Beijing, China (5 pages total, including English translation).
National Intellectual Property Administration, People's Republic of China, Decision on Rejection, May 18, 2023, Beijing, China (20 pages total, including English translation).
National Intellectual Property Administration, PRC, Notification of Reexamination in Application No. 201980033175.3, Mar. 27, 2024, 20 pages total (including English translation), China.
Authored and edited by Yujie Li, Book 5, Qingqi motorcycle structure, use and maintenance, Jindun Press, Jun. 1998, pp. 210-211, China.

* cited by examiner

BATTERY CASE

CROSS-REFERENCE TO RELATED APPLICATIONS

This application is a U.S. national stage entry under 35 U.S.C. § 371 of PCT International Patent Application No. PCT/EP2019/062081, filed May 10, 2019, which claims priority to Swiss Patent Application No. 00659/18, filed May 24, 2018, the contents of each of which are incorporated herein by reference in their entirety.

FIELD OF THE INVENTION

The present invention relates to a battery case for an electric vehicle and an electrical vehicle comprising such a battery case.

BACKGROUND OF THE INVENTION

From the prior art, different types of cases for battery packs for electric vehicles are known.

US2010136402A by Tesla Motors Inc. was published on 3 Jun. 2010. It discloses a sealed battery case to extend the life of the batteries contained therein. The sealed battery case shall reduce contamination from water or other liquids and gases. It comprises a first housing member configured to hold a plurality of batteries. The first housing member comprises a first impermeable material. A second housing member is configured to be coupled to the first housing member, wherein the second housing member comprises a second impermeable material. An impermeable sealing gasket is configured to fit between a first sealing surface corresponding to said first housing member and a second sealing surface corresponding to said second housing member. Means to secure the first housing member to the second housing member with said impermeable sealing gasket interposed between said first and second sealing surfaces. A pressure management system is coupled to the sealed battery pack enclosure, wherein said pressure management system limits a pressure differential between an inner volume of said sealed battery pack enclosure and the outside environment.

US2016023688A by Porsche AG was published on 10 Jan. 2017 and discloses an underbody unit for a motor vehicle body, which has a floor body connectable to the motor vehicle body for dissipating static and/or dynamic loads. Reinforcing ribs protrude up from the floor body. The reinforcing ribs together with the floor body delimit receiving pockets for receiving battery cell units of a traction battery for driving the motor vehicle. First and second connections supply and remove a liquid cooling medium for cooling the floor body. The battery cell units are above the floor body and can be inserted into the underbody unit. Thus, the underbody unit, the reinforcing ribs and the connections for the coolant define a supporting plate that can support the heavy battery cell units, form armor plating for protection and a heat exchanger for active and/or passive cooling.

US2015135939A by Atieva Inc. was published on 21 May 2015 and describes a battery pack protection system which is provided for use with an electric vehicle in which the battery pack is mounted under the car. The system utilizes a plurality of deformable cooling conduits located between the lower surface of the batteries within the battery pack and the lower battery pack enclosure panel. The cooling conduits are configured to deform and absorb impact energy when an object, such as road debris, strikes the lower surface of the lower battery pack enclosure panel. Further protection may be achieved by positioning a ballistic shield, alone or with a layer of compressible material, under the second surface of the battery pack.

US2012312614A by Honda Motor Co Ltd. was published on 26 Mar. 2013 and discloses a power supply apparatus which includes a plurality of battery modules, a support plate, a plurality of first reinforcing projections and a plurality of second reinforcing projections. The support plate supports the battery modules and includes a first plate and a second plate. The first plate thermally contacts second surfaces of the battery modules. The second plate is placed on a second surface of the first plate to define cooling spaces between the first and second plates. A coolant is to flow in the cooling spaces.

DE102010024320A1 by Audi AG was published on 22 Dec. 2011 and discloses a device which has a holding unit attached to a supporting structure. The holding unit is formed with several layers. The holding unit is designed as a sandwich component with a plate-like top layer and a plate-like bottom layer. An energy absorption layer is formed between the top layer and the bottom layer. A battery faces the plate-like top layer, where the plate-like top layer is designed as a cooling device. The top layer comprises a cooling passage for formation of the cooling device. The energy absorption layer is made of resilient material.

SUMMARY OF THE INVENTION

In electrical vehicles battery packs are preferably integrated in the floor of the vehicle. The battery packs are therefore usually mounted from below to the floor of the vehicle. This has the advantage that the center of gravity is low which again has a positive influence on the stability and driving characteristics of the car. However, this also requests special requirements to protect the battery modules (cells) arranged in the battery case from external influences, such as e.g. humidity, static and dynamic loads, impact due to crashes or unwanted ground contact, etc. In addition, being electrochemical systems, battery packs are highly dependent on the operating temperature. Temperature directly influence the power and energy provided by the battery pack, as well as its charging behavior. Consequently, operation of a battery pack within a specific temperature range is essential for the total efficiency of a battery pack, as well as for device safety and reliability.

There is a need for systems that allow to protect the battery modules from outside influences as well as to maintain the temperature of the battery modules in the battery pack in an acceptable range. Most time such systems will be used for cooling of a battery pack, respectively removal of thermal energy from a battery pack. Such mode of operation will typically be applied during driving of a vehicle or charging of a battery pack. However, systems for temperature regulations may also be used to heat a battery pack, respectively to maintain a minimal temperature. Such a mode of operation may be applied in cold regions in order to improve driving range and charging performance. In order to allow capable cooling and/or heating of a battery pack, efficient transfer of thermal energy between a system for thermal control and a battery pack is required.

At the same time such a system for thermoregulation must not impair vehicle safety. On the one hand, intrusion of coolant (if present) into the battery pack has to be ruled out in order to prevent short-circuits and other types of damage to the battery. On the other hand, a system for thermoregulation must not negatively interfere with the structural integrity and mechanical safety of a battery pack. Battery packs usually occupy a substantial part of an electric vehicle's underbody area, where they are prone to damage not only from frontal, posterior and lateral impacts but also from impacts from below. Such impacts may result from unevenness in the road surface and debris but may e.g. also be caused by accidentally rising retractable bollards. Mechanical impacts to the mechanically sensitive and expensive battery packs cannot only cause expensive damage, but may also be very dangerous for passengers due to the high energy density present in these devices. Therefore, in order to bear and protect battery packs in electric vehicles, mechanically competent support structures as well as underfloor shields are required. Nevertheless, the systems known in the prior art typically account for a substantial fraction of a vehicles total mass, as do the battery packs. Hence, the solutions known for energy storage significantly contribute to the total weight of electric vehicles which hence affects the energy economy of electric vehicles. At the same time complexity of assembly and disassembly of an electric vehicle has to be minimized and replacement and/or maintenance of a battery pack has to be quick and straightforward.

Therefore, efficient systems for support and/or thermoregulation and/or protection of battery packs are needed which are compact, lightweight and can be easily integrated within the vehicle structure, respective the vehicle underbody.

A battery case according to the invention has the advantage that the static and dynamic forces occurring during operation of a vehicle are received primarily by a special support structure which also is foreseen to protect the battery modules arranged in the battery pack from a significant part of the external influences, occurring e.g. due to impact etc. A battery case according to the invention normally comprises at least one compartment for at least one battery module. The battery module itself may comprise one or several battery cells. If appropriate the battery case is capable to hermetically seal the at least one battery module arranged therein with respect to the outside. In a preferred variation the battery case comprises a frame-like support structure (frame). In a preferred variation, the frame-like support structure comprises two essentially straight first outer beams extending in a first spatial direction and two second outer beams extending in a second spatial direction. The second outer beams are normally arranged essentially perpendicular to the first outer beams and connected to them at their respective ends. If appropriate, at least one of the first and/or the second beam can be curved, resulting in an at least partially non-parallel arrangement. Depending on the field of application the frame-like support structure can be open, i.e. comprise a gap.

The frame-like support structure encompasses a frame opening foreseen to receive a tub-shaped insert. The tub-shaped insert forms part of the compartment and is foreseen to receive at least one battery module on the inside. In a preferred variation, the tub-shaped insert is connected to the grid like support structure from a third direction arranged essentially perpendicular to the first and the second direction. The tub-shaped insert may comprise along an outer region a retaining edge or a similar means in a mounted position interconnects to the frame-like support structure. One advantage of the battery case according to the invention as described herein is the functional separation between the frame-like support structure and the tub-shaped insert. While the tub-shaped insert is foreseen to primarily hermetically seal the at least one battery pack on the inside, the frame-like support structure is foreseen to receive and transfer the occurring dynamic and static loads between the at least one battery pack (battery case, including battery modules) and the chassis of a vehicle to which the battery pack is attached. A further purpose of the frame-like support structure is to efficiently protect the battery modules arranged in the tub-shaped insert from impact from the outside. The frame like support structure can be arranged spaced apart from the tub-shaped insert at least partially, providing more room to absorb deformation without harm to the battery cells, e.g. due to external impact e.g. during an accident. If appropriate the frame-like support structure can comprise and/or be interconnected to at least one crash-element foreseen to absorb impact energy introduced from the outside, namely in the plane formed by the first and the second beam of the support structure. Good results are achieved when the tub-shaped insert structure is hooked into the frame-like support structure from above and/or below. If appropriate the tub-shaped insert may comprise more than one part. The battery case further comprises a closure (lid) suitable to close the tub-shaped insert to form the closed compartment for the at least one battery module. The closure preferably attaches to the tub-shaped insert. Alternatively or in addition the closure can interconnect to the tub-shaped insert via the frame-like support structure. Very good results can be achieved when the first and the second outer beams are interconnected to each at their end region directly. At least one of the first and/or the second beams may comprise a flange to attach the battery case to a chassis of a vehicle (primary load path). Depending on the field of application, other direct or indirect fastening means are possible. As mentioned above, at least one of the first and/or the second beam may comprise at least one reinforcing element arranged laterally along the respective first and/or second beam to absorb/compensate external loads and to protect the at least one battery module. At least one of the first and/or the second beams may comprise a hollow cross-section having at least one cell. If appropriate, the at least one cell is at last partially filled by a filling material, such as a foam. The frame-like support structure is preferably made from metal beams, fiber reinforced composite material or a combination thereof. First, respectively second beams can be at least locally reinforced by at least one layer of fiber reinforced plastic material or vice-versa. Depending on the field of application, the tub-shaped insert is at least partially made from a fiber reinforced plastic material and/or deep drawn sheet metal and/or injection molding of plastic material. If appropriate the cooling means can be integrated in the walls of the tub-shaped insert.

The tub-shaped insert may comprise at least one base section in a mounted position arranged below the at least one battery module comprising at least one cooling/heating means which in an assembled position is in thermal contact with the at least one battery module arranged in the tub-shaped insert. The at least one cooling means can be designed comprising at least one cooling/heating plates which are preferably arranged inside the compartment. The base section of the tub-shaped insert may comprise at least one recess in which at least one cooling means is arranged. Alternatively or in addition the cooling means can be arranged on the outside of the tub-shaped insert. In this case at least the area of the tub-shaped insert arranged between the at least one battery module and the cooling means consists of thermally conductive material. The base section itself can be reinforced to absorb impact from below.

In a preferred variation at least one first inner beam is present, which is arranged in the first direction interconnecting two second outer beams arranged opposite to each other. Alternatively or in addition at least one second inner beam is present, which is arranged in the second direction interconnecting two first outer beams arranged opposite to each other. The first and the second inner beams, if present, form a ladder-like or grid-like support structure on the inside of the frame-like support structure. At least one first and at least one the second inner beam may be arranged with respect to the third direction on the same or on different level at least partially offset with respect to each other. The at least one first and second beam if present preferably support the thereto interconnected first and second outer beams from the inside in their length direction. The first and second inner beams can be foreseen to support the tub-shaped insert at least by transferring weight load to the outer beams. Alternatively or in addition the inner beams can form part of the primary load path, e.g. in that the battery case is interconnected via them to a chassis of a vehicle. In a preferred variation, at least one first and/or second inner beam is arranged in a channel of the tub-shaped insert. At least one first and/or second inner beam can be arranged inside the tub-shaped insert. It can be interconnected to at least one first and/or second beam arranged on the outside. Good results can be achieved when the base section is a sandwich construction comprising at least one in inner layer and at least one outer layer and core arranged there between.

In a preferred variation, the closure comprises a multi-layer construction with a first layer made from sheet metal and thereto at least partially attached second layer made from fiber reinforce plastic material. In a preferred variation, the interconnection between the first and the second layer is designed such that in case of fire the first and the second layer separate from each other in a controlled manner. When the second layer comprises e.g. fiber glass or an equivalent or better thermal stable and insulating material, the thermal stress of the first layer made from sheet metal can be reduced which can be of advantage in case of emergency. The closure comprising a combination of first and second layer as described above, should thus be considered a separate inventive concept, which may be made subject of one or several divisional patent applications.

In a top view the frame-like support structure may in the outer contour comprise at least one recess extending inwardly, e.g. to avoid collision with an aggregate or a structural part of the vehicle to which the battery case is attached. The tub-shaped insert preferably follows the contour of the recess.

If appropriate, the frame-like support structure can be used to support distribution of a cooling agent for the battery modules, e.g. in that the cooling agent is guided through at least one inner and/or outer beam. Supply of the cooling agent can e.g. be conducted by an outer beam and a thereto fluidly interconnected inner beam while discharge of the cooling agent takes place by an opposite and/or adjacent outer beam and at least one thereto fluidly connected inner beam.

If appropriate the battery case may comprise a bottom which is interconnected to the frame-like support structure. The bottom can act as a shield to protect the tubs-shaped insert from below. A hollow can be arranged between the bottom and the tub-shaped insert. The bottom can be made accessible when the tub-shaped insert is separated from the frame-like support structure. The hollow can be used to distribute a cooling agent. Good results regarding cooling can be achieved when the cooling agent is in direct contact with the tub-shaped insert which in this case preferably has a high thermal conductivity at least in the area where the battery modules are in contact with the tub-shaped insert.

It is to be understood that both the foregoing general description and the following detailed description present embodiments, and are intended to provide an over-view or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The herein described invention will be more fully understood from the detailed description given herein below and the accompanying drawings which should not be considered limiting to the invention described in the appended claims. The drawings are showing schematically:

DESCRIPTION OF THE EMBODIMENTS

Reference will now be made in detail to certain embodiments, examples of which are illustrated in the accompanying drawings, in which some, but not all features are shown. Indeed, embodiments disclosed herein may be embodied in many different forms and should not be understood as limited to the embodiments set forth herein; rather, these embodiments are provided so that this disclosure will satisfy applicable legal requirements. Whenever possible, like reference numbers will be used to refer to like components or parts.

Figure 1:
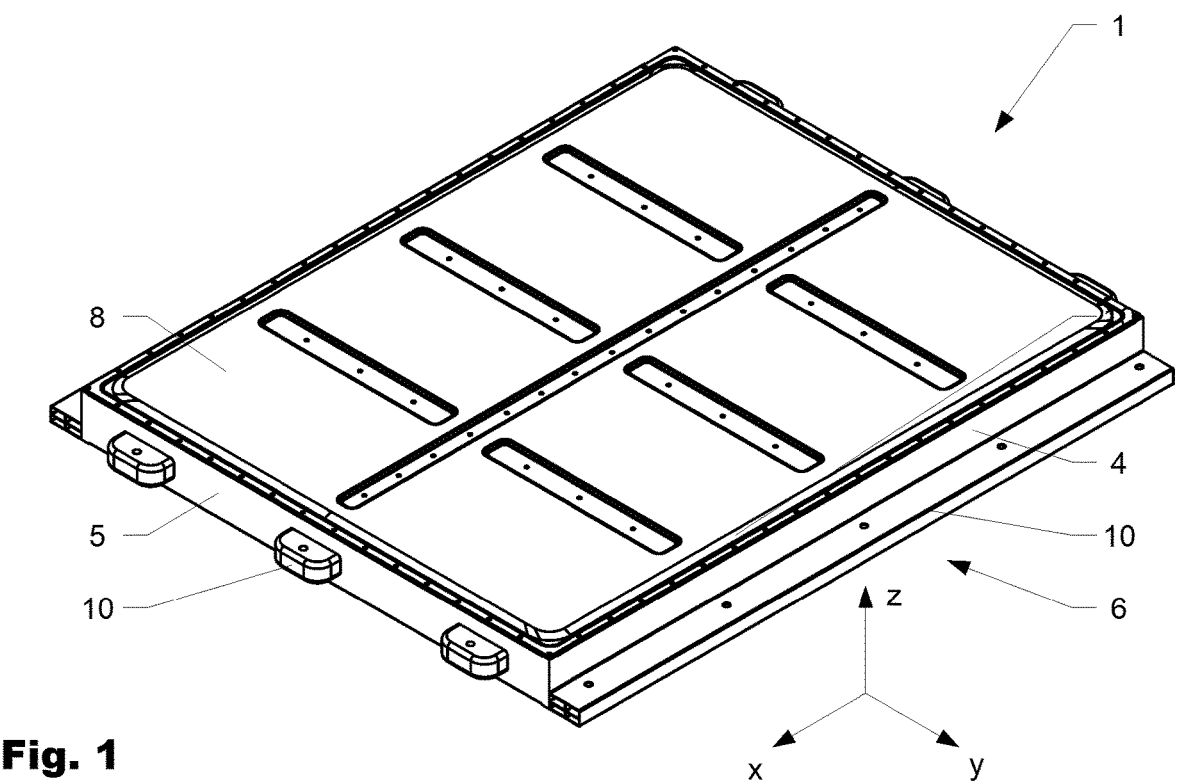
FIG. 1 a battery case in a perspective view from above.
Figure 2:
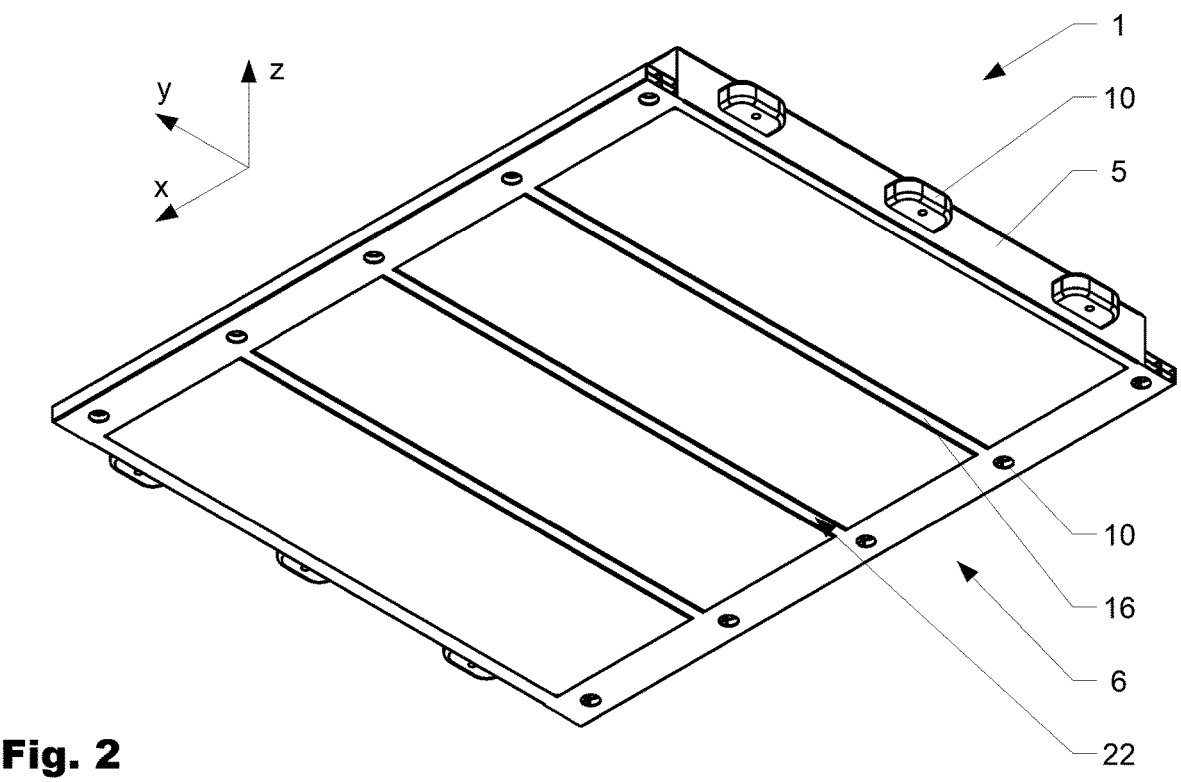
FIG. 2 the battery case according to FIG. 1 in a perspective view from below.
Figure 3:
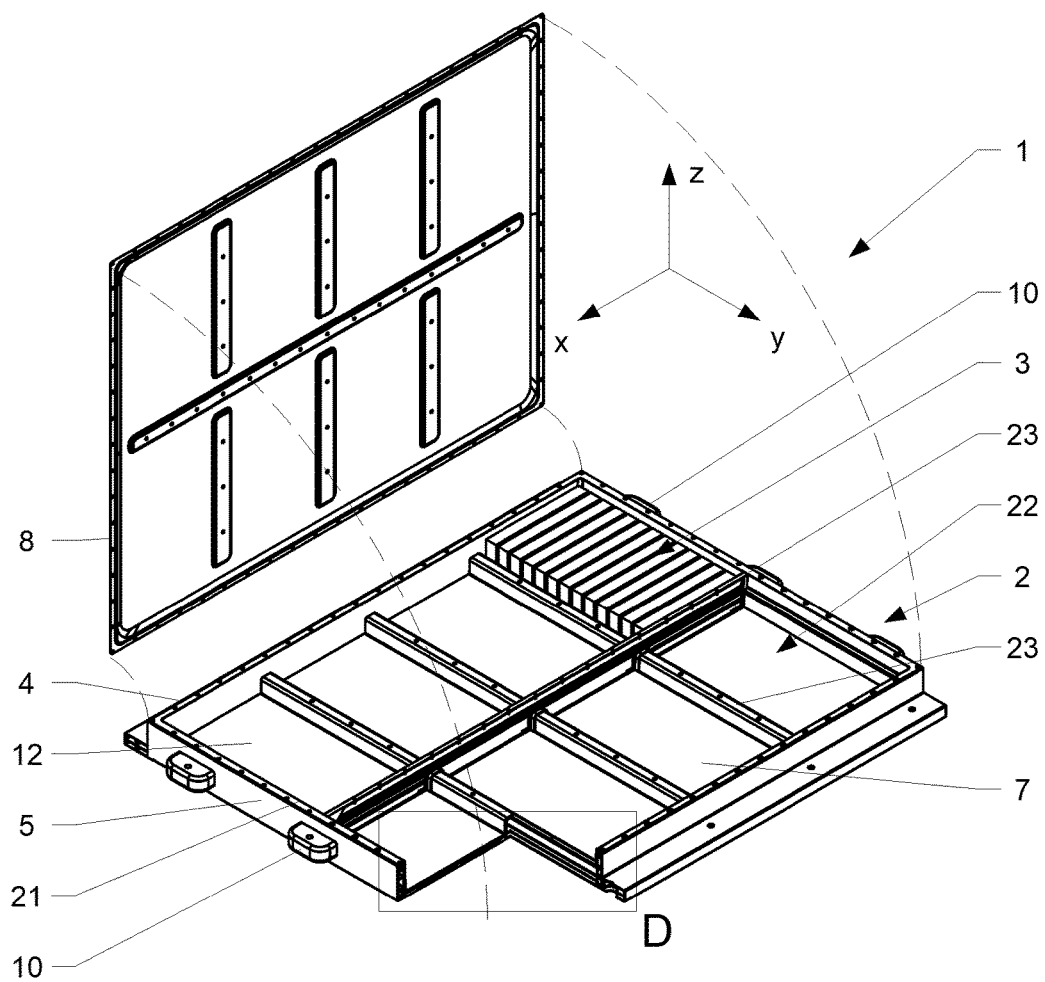
FIG. 3 the battery case according to FIG. 1 in an opened state.
Figure 4:
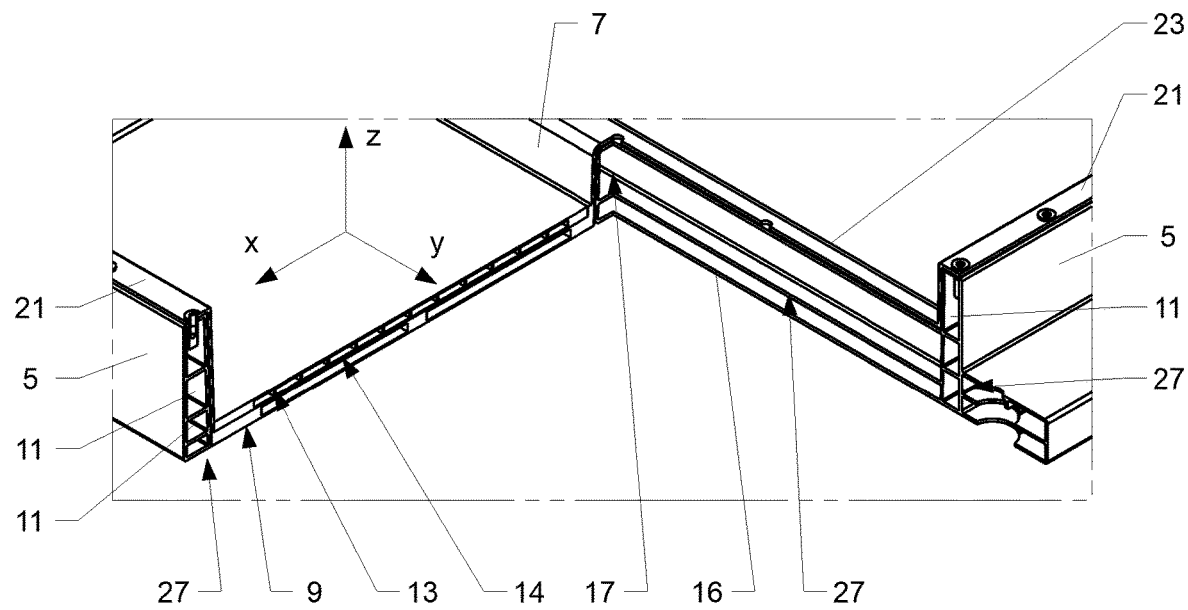
FIG. 4 detail D from FIG. 3.
Figure 5:
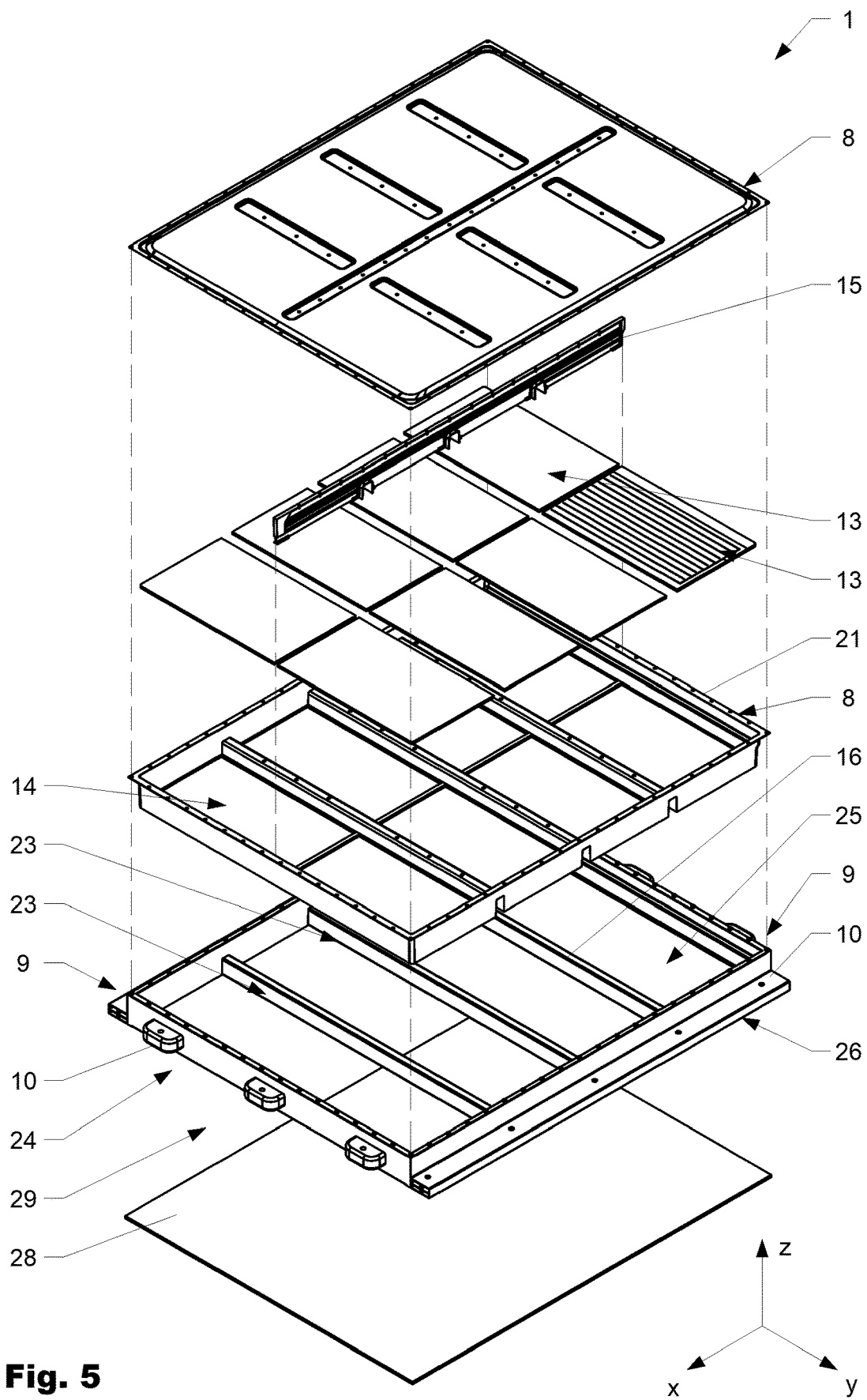
FIG. 5 the battery case according to FIG. 1 in an exploded view.

FIG. 1 is showing a battery case 1 in a closed state in a perspective view from above. FIG. 2 is showing the battery case 1 in a closed state in a perspective view from below. FIG. 3 is showing the battery case 1 with a closure 8 in an open state. FIG. 4 is showing Detail D according to FIG. 3. FIG. 5 is showing the battery case 1 in an exploded view deconstructed in vertical direction (z-direction).

The battery case 1 comprises a compartment 2 for at least one battery module 3. The battery case 1 as shown further comprises two first outer beams 4 extending essentially parallel to each other in a first spatial direction (x-direction) and two second outer beams 5 extending essentially parallel to each other in a second spatial (y-direction). They are arranged essentially perpendicular to the first spatial direction. The first and second beams 4, 5 are forming a frame-like support structure 6 protecting and supporting the at least one battery modules 3 with respect to the environment. A tub-shaped insert 7 is connected to the grid like support structure 6 from a third direction (z-direction) arranged essentially perpendicular to the first and the second direction x, y. Good results can be achieved when the tub shaped insert 7 comprises a retaining edge 21 or similar means by which it can be interconnected to the frame-like support structure 6, e.g. hooked into it from above or below. Furthermore the battery case 1 comprises a closure 8 suitable to close the tub-shaped insert 7 to form a closed, if necessary, hermetically sealed compartment 2 for the at least one battery module 3. The closure 8 preferably interacts directly with the tub-shaped insert 7. As it can be seen in FIG. 3, the compartment 2 formed by the tub-shaped insert 7 comprises several recesses 22 delimited from each other by strut-like protrusions 23 emerging from the base section 12. As e.g. visible in FIG. 4, the strut-like protrusions 23 produce on the outside channels 17 suitable to receive a thereto related first, respectively second inner beam 15, 16. The strut-like protrusions can be used as supporting means for the battery modules 3 arranged therein. The recesses 22 are preferably adapted to the size of the battery modules 3, such that they are well supported in longitudinal and transversal direction.

As it can be seen in the exploded view according to FIG. 5, the support structure 6 comprises first and second outer beams 4, 5 which are interconnected to each other at their end region 9 forming a frame-like support structure (frame) 24 which encompasses a frame opening 25. Inside the frame 24 inner beams 16 are present which extend between two opposite (first) outer beams 4. The first, respectively second beams 4, 5 comprise a flange 10 to attach the battery case 1 to a chassis of a vehicle (not shown in detail) and/or the handle the battery case during assembly and maintenance. If appropriate at least one of the first and/or the second beams 4, 5 comprises at least one reinforcing element 26. Depending on the occurring structural loads, good results can be achieved when the at least one reinforcing element 26 is arranged laterally along the respective first and/or second beam 4, 5.

The battery case 1 comprises a closure 8 which preferably has a multi-layer construction with first layer made from sheet metal and thereto at least partially attached second layer made from fiber reinforce plastic material (both not shown in detail). In a preferred variation, the interconnection between the first and the second layer is designed such that in case of fire the first and the second layer separate from each other in a controlled manner. When the second layer is arranged on the inside and comprises e.g. fiber glass or an equivalent or better thermal stable and insulating material, the thermal stress of the first layer made from sheet metal can be reduced which can be of advantage in case of emergency. Furthermore the risk of short-circuit fault can be reduced.

As visible in the section view according to FIG. 4, at least one of the first and/or the second beams 4, 5 comprises a hollow cross-section 27 having at least one cell 11. If appropriate the at least one cell 11 can be filled at last partially by a filling material (not shown in detail).

The tub-shaped insert 7 can be at least partially made from a fiber reinforced plastic material. Alternatively or in addition it can e.g. be made at least partially from deep drawn sheet metal and/or injection molding of plastic material. The tub-shaped insert 7 comprises at least one base section 9 comprising at least one cooling means 13 which in an assembled position is in thermal contact with the at least one battery module 3 arranged in the tub-shaped insert 7. In the present variation, the at least one cooling means is a cooling plate 13 which is arranged inside the compartment 2 in a recess 14.

As visible in FIG. 5, the battery case 1 may comprise a bottom 28 which is interconnected to the frame-like support structure 6. A hollow 29 can be arranged between the bottom 28 and the tub-shaped insert 7. The bottom 28 can be made accessible from the outside when the tub-shaped insert 7 is separated from the frame-like support structure 6. The hollow can be used to distribute a cooling agent (not shown in detail). Good results regarding cooling can be achieved when the cooling agent is in direct contact with the tub-shaped insert 7 which in this case preferably made from a material which has a high thermal conductivity at least in the area where the battery modules 3 are in contact with the tub-shaped insert 7.

LIST OF DESIGNATIONS

| | |
|---|---|
| 1 | Battery case |
| 2 | Compartment |
| 3 | Battery module |
| 4 | First outer beam/Outer beam |
| 5 | Second outer beam/Outer beam |
| 6 | Support structure |
| 7 | Tub-shaped insert |
| 8 | Closure (lid) |
| 9 | End region (outer beam) |
| 10 | Flange (outer beam) |
| 11 | Cell (cross-section first, second beam) |
| 12 | Base section (tub-shaped insert) |
| 13 | Cooling means/cooling |
| 14 | Recess (for cooling means) |
| 15 | First inner beam/Inner beam |
| 16 | Second inner beam/Inner beam |
| 17 | Channel (tub-shaped insert) |
| 18 | Inner layer (base section) |
| 19 | Outer layer (base section) |
| 20 | Core (base section) |
| 21 | Retaining edge |
| 22 | Recess (compartment) |
| 23 | Strut-like protrusion |
| 24 | Frame (support structure) |
| 25 | Frame opening (support structure) |
| 26 | Reinforcing element |
| 27 | Cross section (beams) |
| 28 | Bottom (support structure) |
| 29 | Hollow (between plate) |

The invention claimed is:

1. A battery case for at least one battery module comprising:
    a. a frame-like support structure suitable to be interconnected to an electric vehicle,
    b. the frame-like support structure encompassing a frame opening, wherein the frame-like support structure comprises and/or is interconnected to at least one crash-element foreseen to absorb impact energy introduced from the outside in the plane formed by the frame-like support structure,
    c. a tub-shaped insert, which is arranged in the frame opening and interconnected to the frame-like support structure, wherein the tub-shaped insert comprises at least one base section comprising at least one cooling plate which in an assembled position with the tub-shaped insert is in thermal contact with the at least one battery module arranged in the tub-shaped insert, and
    d. a closure suitable to close and the tub-shaped insert to form a compartment for the at least one battery module,
    e. wherein the at least one cooling plate is arranged inside or outside the compartment, and
    f. wherein the frame-like support structure comprises two first outer beams extending in a first spatial direction and two second outer beams extending in a second spatial direction arranged essentially perpendicular to the first spatial direction, the first and second outer beams forming a load bearing structure encompassing the tub-shaped insert circumferentially, and g. wherein at least one first inner beam is arranged in the first direction interconnecting the two second outer beams arranged opposite to each other and at least one second inner beam is arranged in the second direction interconnecting the two first outer beams arranged opposite to each other.

2. The battery case according to claim 1, wherein the frame-like support structure has in a top view an in principle rectangular shape.

3. The battery case according to claim 1, wherein the frame-like support structure in a top view comprises at least one recess extending inwardly, wherein the tub-shaped insert follows the contour of the recess.

4. The battery case according to claim 1, wherein at least one of the first and/or the second outer beams comprises a flange to attach the battery case to a chassis of a vehicle.

5. The battery case according to claim 1, wherein at least one of the first and/or the second outer beams comprises at least one reinforcing element arranged laterally along the respective first and/or second beam.

6. The battery case according to claim 1, wherein at least one of the first and/or the second outer beams comprises a hollow cross-section having at least one cell.

7. The battery case according to claim 1, wherein the frame-like support structure is used to distribute a cooling agent.

8. The battery case according to claim 1, wherein the base section of the tub-shaped insert comprises at least one first recess in which the at least one cooling plate is arranged.

9. The battery case according to claim 1, wherein the battery case comprises a bottom which is interconnected to the frame like support structure.

10. The battery case according to claim 9, wherein a hollow is arranged between the bottom and the tub-shaped insert and is used to distribute a cooling agent.

11. The battery case according to claim 10, wherein the hollow is fluidly interconnected to at least one of the outer beams and/or inner beams.

12. The battery case according to claim 1, wherein at least one first and/or second inner beam is arranged in a channel of the tub-shaped insert.

13. The battery case according to claim 1, wherein the channel is arranged in a strut-like protrusion of the tub-shaped insert emerging above the base section.

14. The battery case according to claim 1, wherein at least one first and/or second inner beam is arranged inside the tub-shaped insert.

15. A battery pack comprising at least one battery case according to claim 1 and at least one battery cell arranged in the compartment.

16. A vehicle comprising the battery pack according to claim 15.

17. A battery case for at least one battery module comprising:

a. a frame-like support structure suitable to be interconnected to an electric vehicle, b. the frame-like support structure encompassing a frame opening, wherein at least one beam of the frame-like support structure comprises at least one reinforcing element arranged laterally along the respective beam to absorb/compensate external loads and to protect the at least one battery module, c. a tub-shaped insert, which is arranged in the frame opening and interconnected to the frame-like support structure, wherein the tub-shaped insert comprises at least one base section comprising at least one cooling plate which in an assembled position with the tub-shaped insert is in thermal contact with the at least one battery module arranged in the tub-shaped insert, and d. a closure suitable to close the tub-shaped insert to form a compartment for the at least one battery module, wherein the closure comprises a multi-layer construction with a first layer made from sheet metal and thereto at least partially attached second layer made from fiber reinforce plastic material, e. wherein the at least one cooling plate is arranged inside or outside the compartment, and f. wherein the base section is a sandwich construction comprising an inner layer, an outer layer, and a core layer arranged therebetween and extending along the inner layer and the outer layer.

* * * * *